US010060824B2

(12) United States Patent
Okerson et al.

(10) Patent No.: US 10,060,824 B2
(45) Date of Patent: Aug. 28, 2018

(54) ADJUSTABLE VARIABLE ATMOSPHERIC CONDITION TESTING APPARATUS AND METHOD

(71) Applicant: Hyperloop Technologies, Inc., Los Angeles, CA (US)

(72) Inventors: Ryan Okerson, Los Angeles, CA (US); Andrew Doyle, Los Angeles, CA (US); Cameron Close, Los Angeles, CA (US); Filip Finodeyev, Laguna Niguel, CA (US); Joshua Giegel, Los Angeles, CA (US); Kaveh Hosseini, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/291,563

(22) Filed: Oct. 12, 2016

(65) Prior Publication Data

US 2017/0102287 A1      Apr. 13, 2017

Related U.S. Application Data

(60) Provisional application No. 62/240,745, filed on Oct. 13, 2015.

(51) Int. Cl.
*G01M 9/04*      (2006.01)
(52) U.S. Cl.
CPC .................................. *G01M 9/04* (2013.01)
(58) Field of Classification Search
CPC .. G01L 7/00; F15B 13/00; F27B 3/00; G01M 9/04
See application file for complete search history.

(56) References Cited

U.S. PATENT DOCUMENTS

| 2,696,110 A | 12/1954 | Eggers, Jr. |
| 3,066,528 A | 12/1962 | Giannini et al. |
| 3,138,019 A | 6/1964 | Fonda-Bonardi |
| 5,419,699 A * | 5/1995 | Hemsath ............... C21D 9/673 |
| | | 432/205 |

(Continued)

FOREIGN PATENT DOCUMENTS

CN          101832619 A        9/2010

OTHER PUBLICATIONS

Search Report issued in WIPO Patent Application No. PCT/US16/56545, dated Feb. 16, 2017.

(Continued)

*Primary Examiner* — Jewel V Dowtin
(74) *Attorney, Agent, or Firm* — Greenblum & Bernstein, P.L.C.

(57) ABSTRACT

An adjustable variable atmospheric condition testing apparatus for testing an object includes an outer chamber, an inner chamber positioned inside and in fluid communication with the outer chamber, a vacuum pump configured to remove gas from the inner and outer chambers, and further configured to expel the removed gas via an exhaust, an intake configured to selectively introduce gas from ambient into the inner chamber via a valve, such that the introduced gas interacts with the object, and a sensor positioned downstream of the object and configured to detect a characteristic of the gas interacting with the object.

18 Claims, 2 Drawing Sheets

(56) References Cited

U.S. PATENT DOCUMENTS

| | | | | |
|---|---|---|---|---|
| 6,041,814 A * | 3/2000 | Kouketsu | ............ | F16K 31/1221 |
| | | | | 137/488 |
| 6,289,737 B1 * | 9/2001 | Kouketsu | ........... | G05D 16/2093 |
| | | | | 73/714 |
| 6,508,268 B1 * | 1/2003 | Kouketsu | ................. | F16K 1/46 |
| | | | | 137/487.5 |
| 8,210,196 B2 * | 7/2012 | Itafuji | ................. | H01L 21/6719 |
| | | | | 137/110 |
| 9,234,586 B2 * | 1/2016 | Kouketsu | ........... | G05D 16/2013 |
| 9,234,595 B2 * | 1/2016 | Kouketsu | ............ | F16K 31/1262 |
| 2008/0176412 A1 * | 7/2008 | Komeda | ............. | C23C 16/4412 |
| | | | | 438/778 |
| 2008/0183340 A1 * | 7/2008 | Kofuji | ................ | G05D 16/2073 |
| | | | | 700/301 |
| 2011/0100489 A1 * | 5/2011 | Orito | ................ | C23C 16/45502 |
| | | | | 137/560 |
| 2011/0223581 A1 * | 9/2011 | Stobbe | ................... | C12M 23/34 |
| | | | | 435/3 |
| 2013/0298659 A1 | 11/2013 | Smith | | |
| 2016/0229418 A1 | 8/2016 | Bambrogan et al. | | |

OTHER PUBLICATIONS

Anyoji et al., "Aerodynamic Measurements in the Mars Wind Tunnel at Tohoku University", 49th AIAA Aerospace Sciences Meeting including the New Horizons Forum and Aerospace Exposition, Jan. 4, 2011, pp. 1-14.

U.S. Appl. No. 15/298,905 to Jett Ferm et al., filed Oct. 20, 2016.

\* cited by examiner

ADJUSTABLE VARIABLE ATMOSPHERIC CONDITION TESTING APPARATUS AND METHOD

CROSS REFERENCE TO RELATED APPLICATIONS

The present application claims the benefit of U.S. Provisional Application No. 62/240,745 filed on Oct. 13, 2015, the disclosure of which is expressly incorporated by reference herein in its entirety.

FIELD OF THE DISCLOSURE

The present disclosure relates to an adjustable variable atmospheric condition testing apparatus and a method for testing an object under variable atmospheric conditions.

BACKGROUND OF THE DISCLOSURE

Traditional transportation modes via water, land, rail and air revolutionized the movement and growth of our current culture. However, the adverse environmental, societal and economic impacts of these traditional transportation models initiated a movement to find alternative transportation modes that take advantage of the significant improvements in transportation technology and efficiently move people and materials between locations. High speed transportation systems utilizing rails or other structural guidance components have been contemplated as a solution to existing transportation challenges while improving safety, decreasing the environmental impact of traditional transportation modes and reducing the overall time commuting between major metropolitan communities.

One type of high-speed transportation system utilizes a low-pressure environment in order to reduce drag on a vehicle at high operating speeds, thus providing the dual benefit of allowing greater speed potential and lowering the energy costs associated with overcoming drag forces. Such systems are embodied by a tubular structure in which a near vacuum exists within the tube.

Frictional forces resulting from the high operating speeds of the vehicle render conventional carrier systems, such as wheels, impractical. Air bearings and other aerodynamic structures of a vehicle have not previously been known to be utilized in ultra-high speed, ultra-low-pressure environments. Thus, there is a need for a testing environment with controlled pressure that can replicate high speed conditions.

A wind tunnel is a tool used in aerodynamic research to study the effects of air moving past solid objects. A wind tunnel consists of a tubular passage with the object under test mounted in the middle. Gas such as air is made to move past the object by a powerful fan system or other means. The test object, often called a wind tunnel model, is instrumented with one or more suitable sensors to measure aerodynamic forces, pressure distribution, or other aerodynamic-related characteristics. These machines are sometimes designed for long-duration testing or variable flow testing, but do not contemplate ultra-low pressure and high Mach scenarios.

A wind tunnel is discussed in Anyoji et al., *Aerodynamic Measurements in the Mars Wind Tunnel at Tohoku University*, 49th AIAA Aerospace Sciences Meeting including the New Horizons Forum and Aerospace Exposition 4-7 Jan. 2011, Orlando, Fla. This wind tunnel includes, inter alia, a buffer tank maintained at a pressure lower than that of a vacuum chamber, and further includes an ejector configured to inject high pressure gas in the wind tunnel test section. To operate this wind tunnel, a vacuum is first created in a vacuum chamber and buffer tank. Once the desired test pressure is reached, the vacuum chamber is sealed off, and the buffer tank is maintained at lower pressure than vacuum chamber. The ejector then uses high high pressure gas to induce flow in the test section of the tunnel. A butterfly valve is then used to control pressure buildup within the vacuum chamber by allowing air to flow into buffer chamber. One disadvantage of such a system is that a wind tunnel test can only be conducted for approximately eight seconds, because after eight seconds the buffer tank can no longer maintain the desired test section pressure in tunnel. Another disadvantage is that the wind tunnel must be shut down each time the airflow or air pressure conditions are changed. It is therefore desirable for a wind tunnel testing apparatus and method that can operate continuously and under varying airflow or air pressure conditions on the fly.

SUMMARY OF THE DISCLOSURE

An adjustable variable atmospheric condition testing apparatus for testing an object includes an outer chamber, an inner chamber positioned inside and in fluid communication with the outer chamber, and a vacuum pump configured to remove gas from the inner and outer chambers, and to expel the removed gas via an exhaust, an intake configured to selectively introduce gas from ambient into the inner chamber via a valve, such that the introduced gas interacts with the object, and a sensor positioned downstream of the object and configured to detect a characteristic of the gas interacting with the object. Also, the vacuum pump may include a plurality of vacuum pumps. Further, the apparatus may operate continuously.

Also provided may be an inwardly-tapering throat positioned in the inner chamber and having opposed walls between which the gas introduced by the intake can flow before interacting with the object. At least one wall of the opposed walls may be movable such that a distance between the opposed walls is adjustable, and such that a velocity of gas introduced by the intake is adjustable during the introduction of gas into the inner chamber. Also, the opposed walls can define two walls of the inner chamber. The throat may be configured to control a flow of gas in the inner chamber within a range of 0.3-2.0 Mach.

A second sensor may be provided upstream of the object and configured to detect a second characteristic of the gas introduced by the intake and before interacting with the object. Further, a throat straightener may be positioned upstream of the inner chamber and configured to straighten a flow of the gas introduced by the intake.

The sensor may be configured to move in at least one direction orthogonal to a direction of the flow of gas in the inner chamber. The sensor may also be configured to move in a plane orthogonal to a direction of the flow of gas in the inner chamber. Further, the sensor is configured to move in three dimensions.

It is further noted that at least one of the vacuum pump and the intake may be configured to control a gas pressure within the inner chamber within a range of 1 Pa to 15,000 Pa.

An aspect of the disclosure provides a method for testing an object under variable atmospheric conditions in a chamber. The method may include closing an intake upstream of the chamber, activating a pump downstream of the chamber to remove gas from the chamber, opening the intake to reach equilibrium with the pump at a test pressure and to introduce a flow of the gas within the chamber such that the gas flow interacts with the object, and detecting a characteristic of the gas interacting with the object.

The method may also include adjusting, after the opening of the intake, a flow rate of the gas within the chamber by adjusting at least one wall within the chamber in a direction orthogonal to the gas flow direction. The method may further include adjusting, after the opening of the intake, a second flow rate of the gas within the chamber by again adjusting at least one wall within the chamber in a direction orthogonal to the gas flow direction and during the flow of gas within the chamber.

The method may additionally include adjusting, after the opening of the intake, the sensor along at least one axis. Also, the characteristic of the gas interacting with the object may be at least one of force, lift, drag, moment, pressure, and flow field.

The method may further include straightening a flow of the gas introduced by the intake.

Other exemplary embodiments and advantages of the present disclosure may be ascertained by reviewing the present disclosure and the accompanying drawings, and the above description should not be considered to limit the scope of the present invention.

BRIEF DESCRIPTION OF THE DRAWINGS

The novel features which are characteristic of the systems, both as to structure and method of operation thereof, together with further objects and advantages thereof, will be understood from the following description, considered in connection with the accompanying drawings, in which a presently preferred embodiment of the system is illustrated by way of example. It is to be expressly understood, however, that the drawings are for the purpose of illustration and description only, and they are not intended as a definition of the limits of the system. For a more complete understanding of the disclosure, as well as other aims and further features thereof, reference may be had to the following detailed description of the disclosure in conjunction with the following exemplary and non-limiting drawings wherein.

DETAILED DESCRIPTION

In the following description, the various embodiments of the present disclosure will be described with respect to the enclosed drawings. As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description is taken with the drawings making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

Figure 1:
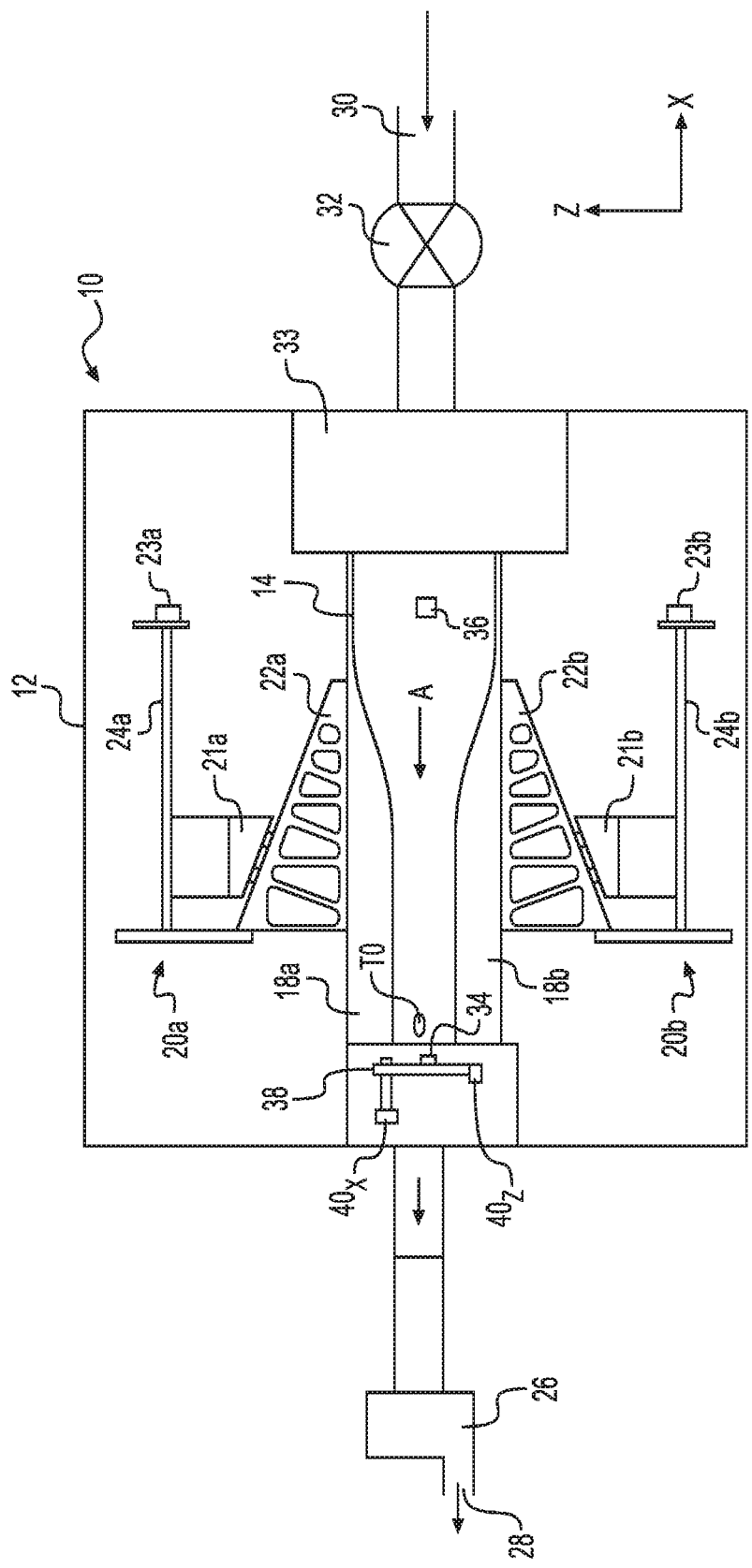
FIG. 1 shows a side sectional schematic view of an adjustable variable atmospheric condition testing apparatus according to an aspect of the disclosure.
Figure 2:
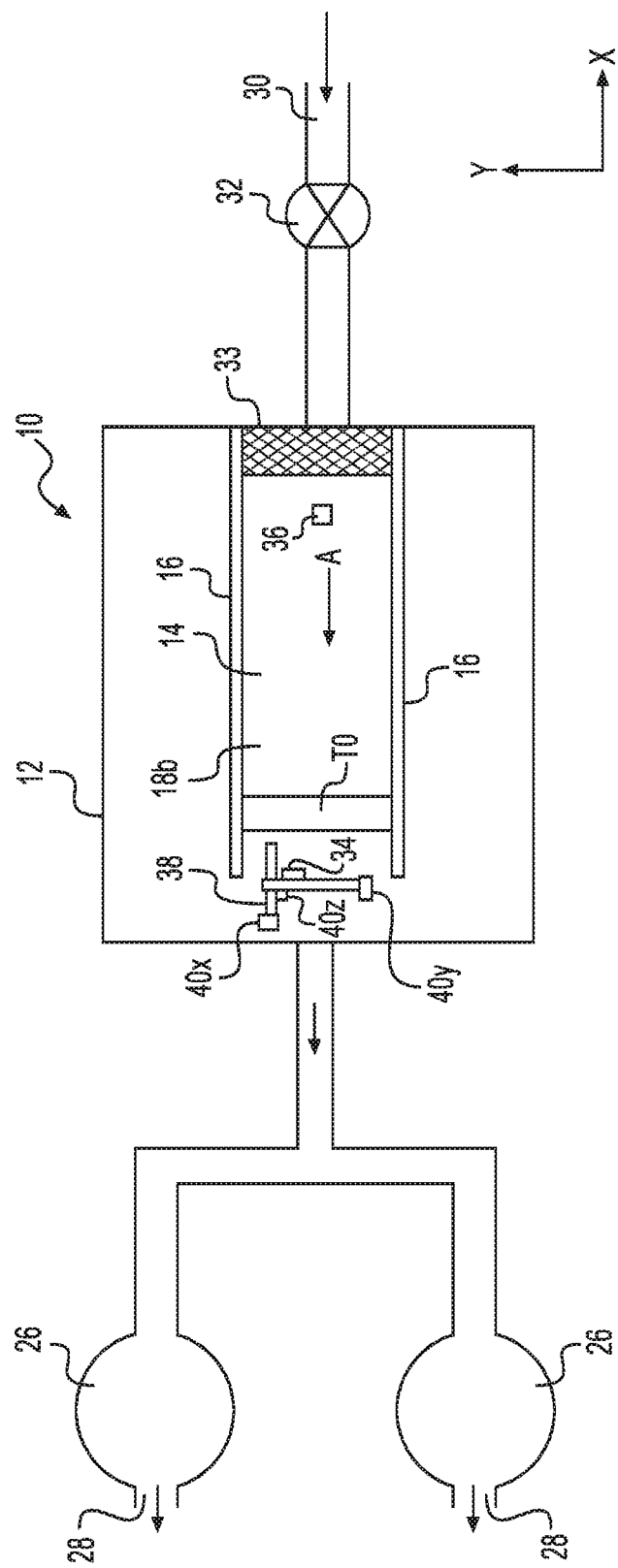
FIG. 2 shows a top plan sectional schematic view of the adjustable variable atmospheric condition testing apparatus of FIG. 1.

Referring to the figures wherein like characters represent like elements, FIGS. 1-2 show an adjustable variable atmospheric condition testing apparatus 10 according to an aspect of the disclosure. The apparatus 10 is configured to conduct long-duration tests of objects TO under adjustable variable flow scenarios of scaled axial compressor blades, air bearings and other aerodynamic structures (collectively referred to herein as "test models" or "test objects." Examples of such aerodynamic structures are discussed in commonly-assigned U.S. application Ser. No. 15/007,783, entitled "Transportation System," filed on Jan. 27, 2016, the entire contents of which are expressly incorporated by reference herein.

The apparatus 10 includes an outer chamber 12 and an inner chamber 14 positioned inside and in communication with the outer chamber. The inner chamber is defined by a pair of inner walls 16, which may be made of a transparent material such as acrylic or other suitable material (although those skilled in the art would appreciate that other non-transparent materials may be used, depending on the application), and by a pair of throat walls 18a, 18b each of which inwardly tapers to form a nozzle in a direction of airflow A.

As shown in FIG. 1, the throat walls 18a, 18b may have a variable geometry such that interchangeable geometries may be selected based on a required mach range, i.e., installing throat walls 18a, 18b that taper inward or outward to achieve different mach ranges. Additionally, the walls are inwardly and outwardly adjustable in a Z-axis direction by throat wall controllers 20a, 20b. Each throat wall controller 20a, 20b may include a respective block 21a, 21b which slidingly engages a respective ramp 22a, 22b; Motors 23a, 23b operably connected to respective screw drive shafts 24a, 24b operate to drive the respective blocks 21a, 21b in the X-axis direction, such that the blocks cause the respective ramps 22a, 22b to push/pull the respective throat walls 18a, 18b in the Z-axis direction, thereby providing for adjustable nozzle geometry within the inner chamber 14. As an alternative to motorized ramps, it is noted that other ways to adjust the nozzle geometry of the apparatus 10 are contemplated in alternative embodiments.

For example, should a user wish to increase the airflow rate, the throat walls 18a, 18b can be inwardly adjusted in the Z-axis direction, and should a should a user wish to decrease the airflow rate, the throat walls 18a, 18b can be outwardly adjusted in the Z-axis direction. While the figures show both throat walls 18a, 18b being adjusted in the Z-axis direction, it is contemplated that only one of the throat walls may be adjustable, depending on the desired application. It noted that the adjustable throat walls 18a, 18b provide for testing in wind flow speeds ranging from subsonic through supersonic regimes, such as 0.3-2.0 Mach (Ma).

The apparatus 10 also includes one or more vacuum pumps 26 configured to remove a gas (including but not limited to air) from the inner and outer chambers through an exhaust 28 to ambient, to thereby decrease the air pressure of the chambers 12, 14 to a range from between 1 Pascal (Pa) and 15,000 Pa. While the apparatus is shown with two vacuum pumps 26, it is contemplated that a single vacuum pump or more than two vacuum pumps may be used, depending on the desired application. In a feature of the disclosure, two vacuum pumps 26 each capable of pumping 2,000 cubic feet per minute (CFM) may be provided in a parallel arrangement (as shown in FIG. 2), although it is contemplated that other arrangements and flow rates may be employed, depending on the desired application.

The apparatus 10 additionally includes an intake 30 configured to selectively introduce gas such as air from ambient into the inner chamber 12 via an adjustable valve 32. The valve 32 regulates the amount of air entering the inner chamber 12 so that the air pressure within the inner chamber can be adjusted. This valve, by controlling the flow of air into the inner chamber 12, simulates the various wind velocities that a test object TO may encounter in a low-pressure environment. The test object TO is removably mounted to a mount located at a downstream side of the inner chamber 12. A flow straightener 33 may also be provided at the region where air is introduced into the inner chamber 12, in order to straighten the flow of air interacting with the test object TO (i.e., in order to keep as much air as possible parallel to the flow direction A/X-axis direction). In an aspect of the disclosure, the flow straightener 33 is a honeycomb structure, but can take other configurations in alternative embodiments. The cross-sectional shapes of each cell can be either square, circular or hexagonal, but can take other shapes in alternative embodiments.

The apparatus 10 further includes one or more first sensors 34 mounted downstream from (i.e. behind the) location of the test object TO, which sense (i.e., detect, measure and/or record) characteristics (including but not limited to force, lift, drag, moment, pressure, and flow field) of the gas interacting with the test object. The first sensors 34 can be pitot tubes with thermocouples, or may be other types of suitable sensors. The apparatus may further include one or more second sensors 36 mounted upstream from (i.e. in front of the) location of the test object TO, which sense characteristics (including but not limited to wind velocity) of the gas entering the inner chamber 12. The second sensors 36 can be pitot tubes with thermocouples, or may be other types of suitable sensors. Once the desired gas characteristics are measured by the sensors 34, 36, data are then communicated to the user via, e.g., a display monitor.

The apparatus 10 may include other sensors and sensing devices in the form of pressure sensitive paint (to measure, e.g., air pressure and oxygen concentration), force balances (to measure, e.g., lift and drag), and small tubes (to measure, e.g., localized vacuum pressure readings and static pressure along the inner chamber 14). Also provided may be a Schlieren optical system to image the flow of fluids (such as air) of varying densities. The test object TO may be held in a way such that the angle of attack is adjustable.

The assembly of first sensors 34 and second sensors 36 may be adjustable in any or all of three dimensions. For example, the first sensors 34 may be held on a frame 38 adjustable in the Y-Z plane and further movable along the X axis direction relative to the test object TO, in order to detect air flow at any point behind the test object. In an aspect of the disclosure, X axis motor 40x is configured to drive the first sensors 34 along the X axis direction, Y axis motor 40y is configured to drive the first sensors 34 along the Y axis direction, and Z axis motor 40z is configured to drive the first sensors 34 along the Z axis direction. It is noted that while the motors 40x, 40y and 40z may move the first sensors 34 via a screw drive arrangement, it is noted that other ways to move the first sensors 34 are contemplated in alternative embodiments.

A method of operating an adjustable variable atmospheric condition testing apparatus 10 according to an aspect of the disclosure will now be described. Initially, the valve 32 of the intake is closed to seal off any incoming gas (such as air) to the chambers 12, 14. Next, the vacuum pump 26 is activated to remove gas from the chambers 12, 14 and expel the gas to ambient, until a desired steady state air pressure is obtained, whereafter the airflow rate is reduced (i.e., the vacuum pump is not turned off). Thereafter, the inlet valve 32 is opened to let air in from ambient, to reach air pressure equilibrium with the vacuum pump 26 and to achieve a desired air pressure in the inner chamber 12. The inlet valve 32 and vacuum pump 26 can operate together to maintain a steady state airflow over the test object TO at a steady state air pressure.

The throat walls 18a, 18b may be inwardly or outwardly adjusted by the throat wall controllers 20a, 20b in the Z-axis direction to achieve a desired inner chamber 12 airflow velocity of the gas interacting with the test object TO. The sensors 34 sense characteristics of the gas interacting with the object, and these characteristics are then communicated to the user via, e.g., one or more display monitors.

Upon viewing the characteristics of the gas interacting with the object, the user may wish to test the object under different airflow or air pressure conditions, and it is noted that the user can adjust the pressure in the inner chamber 12 by opening or closing the inlet valve and/or increasing or decreasing the vacuum pump speed 26, and can further adjust the airflow rate by adjusting throat walls 18a, 18b in the Z-axis direction. It is noted that both such adjustments can be made "on the fly," i.e., during the testing process (i.e., while gas is still flowing through the inner chamber 12), especially since in a feature of the disclosure, the apparatus 10 ingests and expels air from/to ambient (i.e., no buffer air tanks are used, which would otherwise limit the duration of a test run due to the limited volume of a buffer tank, and there is also no closed loop of airflow, which would also limit the duration of a test run). It is also noted that the positions of the sensors 34, 36 can be adjusted on the fly as well. Thus, multiple tests on the test object TO can be run under varying conditions indefinitely, without cutting off the vacuum pump 26 or closing the inlet valve 32 (i.e., while gas is still flowing through the inner chamber 12).

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, servers, methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the invention has been described with reference to specific embodiments, those skilled in the art will understand that various changes may be made and equivalents may be substituted for elements thereof without departing from the true spirit and scope of the invention. While exemplary embodiments are described above, it is not intended that these embodiments describe all possible forms of the invention. Rather, the words used in the specification are words of description rather than limitation, and it is understood that various changes may be made without departing from the spirit and scope of the disclosure. In addition, modifications may be made without departing from the essential teachings of the invention. Furthermore, the features of various implementing embodiments may be combined to form further embodiments of the invention.

What is claimed is:

1. An adjustable variable atmospheric condition testing apparatus for testing an object, the apparatus comprising:
    an outer chamber;
    an inner chamber positioned in and at the same pressure as the outer chamber;
    a vacuum pump configured to remove gas from the inner and outer chambers, and further configured to expel to ambient the removed gas via an exhaust;
    an intake configured to selectively introduce gas from ambient into the inner chamber via a valve, such that the introduced gas interacts with the object;
    a sensor positioned downstream of the object and configured to detect a characteristic of the gas interacting with the object; and
    an inwardly-tapering nozzle positioned in the inner chamber and having opposed walls between which the gas introduced by the intake can flow before interacting with the object, wherein at least one wall of the opposed walls is movable such that a distance between the opposed walls is adjustable, and such that a velocity of gas introduced by the intake is adjustable during the introduction of gas into the inner chamber.

2. The apparatus according to claim 1, wherein the opposed walls define two walls of the inner chamber.

3. The apparatus according to claim 1, further comprising a second sensor positioned upstream of the object and configured to detect a second characteristic of the gas introduced by the intake and before interacting with the object.

4. The apparatus according to claim 1, further comprising a flow conditioner positioned upstream of the inner chamber and configured to condition a flow of the gas introduced by the intake to achieve a certain characteristic.

5. The apparatus according to claim 1, wherein the vacuum pump comprises a plurality of vacuum pumps.

6. The apparatus according to claim 1, wherein the sensor is configured to move in at least one direction orthogonal to a direction of the flow of gas in the inner chamber.

7. The apparatus according to claim 1, wherein the sensor is configured to move in a plane orthogonal to a direction of the flow of gas in the inner chamber.

8. The apparatus according to claim 1, wherein the sensor is configured to move in three dimensions.

9. The apparatus according to claim 1, wherein the nozzle is configured to control a flow of gas in the inner chamber within a range of 0.3-2.0 Mach.

10. The apparatus according to claim 1, wherein at least one of the vacuum pump and the intake are configured to control a gas pressure within the inner chamber within a range of 1 Pa to 15,000 Pa.

11. The apparatus according to claim 1, wherein the apparatus is configured to operate continuously.

12. The apparatus according to claim 1, wherein the characteristic of the gas interacting with the object is at least one of force, lift, drag, moment, pressure, temperature, velocity and flow field.

13. A method for testing an object under variable atmospheric conditions in a chamber, the method comprising:
   selecting a nozzle geometry that allows a required mach range;
   closing an intake upstream of the chamber;
   activating a pump downstream of the chamber to remove gas from the chamber;
   opening the intake to reach equilibrium with the pump at a test pressure and to introduce a flow of the gas within the chamber such that the gas flow interacts with the object;
   detecting a characteristic of the gas interacting with the object.

14. The method according to claim 13, further comprising adjusting, after the opening of the intake, a flow rate of the gas within the chamber by adjusting at least one wall within the chamber in a direction orthogonal to the gas flow direction.

15. The method according to claim 14, further comprising adjusting, after the opening of the intake, a second flow rate of the gas within the chamber by again adjusting at least one wall within the chamber in a direction orthogonal to the gas flow direction and during the flow of gas within the chamber.

16. The method according to claim 13, further comprising adjusting, after the opening of the intake, the sensor along at least one axis.

17. The method according to claim 13, wherein the characteristic of the gas interacting with the object is at least one of force, lift, drag, moment, pressure, temperature, velocity and flow field.

18. The method according to claim 13, further comprising conditioning a flow of the gas introduced by the intake.

* * * * *